Aug. 28, 1934. W. A. THUM Re. 19,297

APPARATUS FOR ATTACHING HEELS TO SHOES

Original Filed Dec. 5, 1931 3 Sheets-Sheet 1

INVENTOR
Walter A. Thum.
By Ralph Kneeth
ATTORNEY

APPARATUS FOR ATTACHING HEELS TO SHOES

Original Filed Dec. 5, 1931 3 Sheets-Sheet 2

INVENTOR
Walter A. Thum.
By Joseph Rauch
ATTORNEY

APPARATUS FOR ATTACHING HEELS TO SHOES
Original Filed Dec. 5, 1931 3 Sheets-Sheet 3
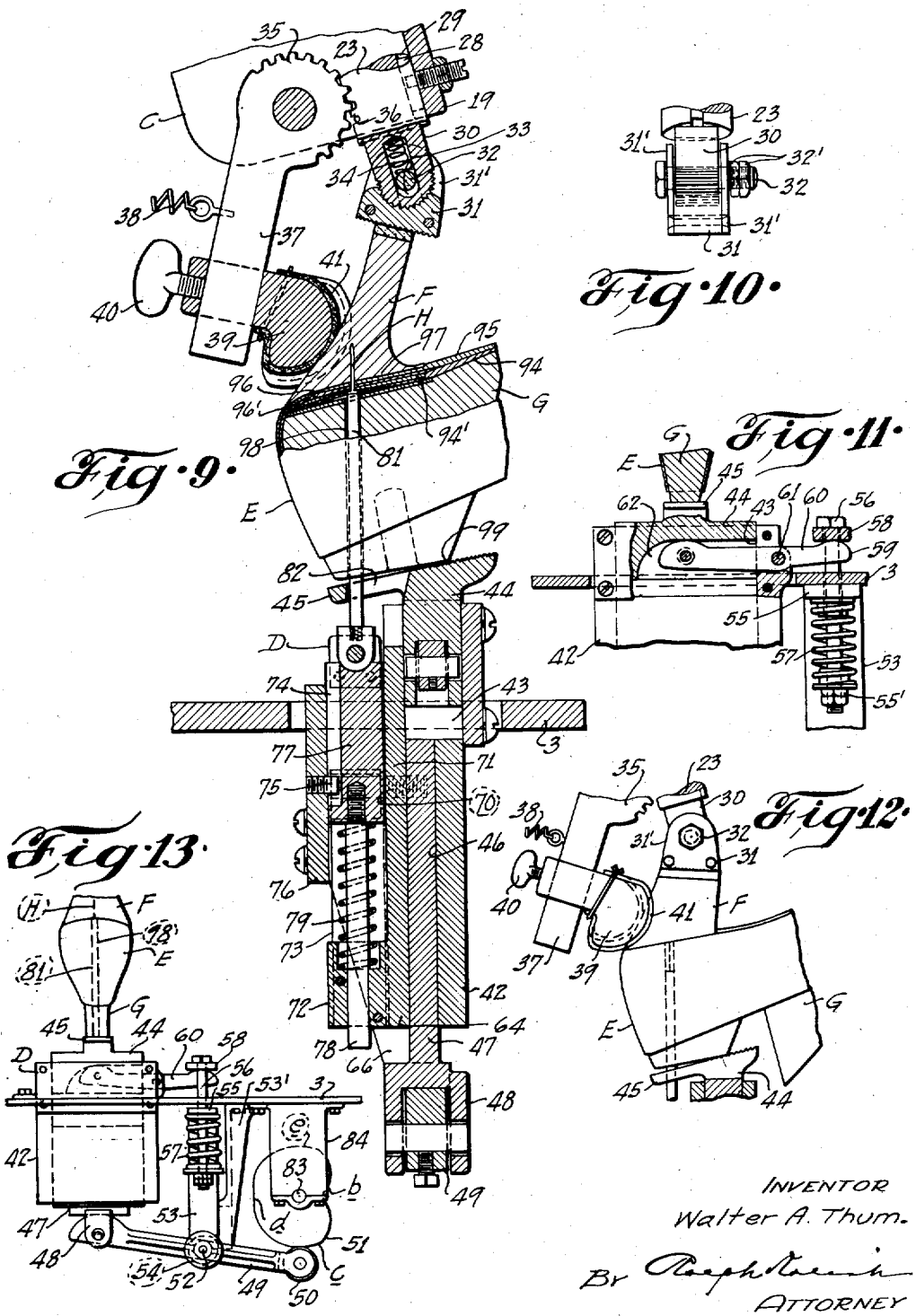
INVENTOR
Walter A. Thum.
By Joseph Rheinis
ATTORNEY Reissued Aug. 28, 1934 Re. 19,297

UNITED STATES PATENT OFFICE 19,297

APPARATUS FOR ATTACHING HEELS TO SHOES

Walter A. Thum, St. Louis, Mo., assignor to United Shoe Machinery Corporation, Paterson, N. J., a corporation of New Jersey Original No. 1,947,666, dated February 20, 1934, Serial No. 579,180, December 5, 1931. Application for reissue June 25, 1934, Serial No. 732,378

24 Claims. (Cl. 1—32)

This invention relates generally to shoe manufacture, and has more particular reference to novel apparatus for attaching heels to shoes.

Heretofore, so far as I am aware, heels have been applied to shoes in two steps or stages widely separated in the shoe-manufacture process, that is to say, an initial step during which the last is in the shoe, and a final step during which the last is removed from the shoe.

Such division of the heel-attaching process has been necessitated, firstly, by reason of the shoe-construction requirement that the last remain in the shoe during the several so-called heel-finishing operations and, secondly, by the heretofore practical impossibility of nailing the heel to the shoe without first removing the last therefrom, it being borne in mind that the heel-securing nails are properly driven from the inside of the shoe outwardly into the heel.

The most immediate source of difficulty in the foregoing procedure resides in the hence unavoidable necessity of initially attaching the heel to the shoe, while the last is contained therein, thus, heretofore, limiting the heel-attaching means to an adhesive applied between the heel and the heel-seat of the shoe.

Under such condition the shoe manufacturer is compelled to suspend operations on the shoe-assembly while the adhesive is drying, or, else, employing such accessory devices, altogether foreign both to the shoe, per se, and the machinery employed for the manufacture thereof, as will suffice for supplying the deficiency in strength of the adhesive until the latter has hardened, such devices requiring two operations, one for their attachment to the shoe-assembly, and the other for their removal therefrom, and hence involving by their use, both, a loss of time, and an expense for material not a part of the finished shoe.

With the foregoing in mind, my invention has for its prime object the provision of a new apparatus whereby there is established an efficient and permanent metallic connection between the heel and the shoe which becomes a part of the finished shoe structure, and entirely avoids the use of extraneous temporary securing devices on the shoe-assembly during the manufacture of the shoe. Although this invention is herein disclosed in connection with the preliminary attachment of heels, in preparation for a succeeding attaching operation, it will be obvious that novel features of my improved apparatus are equally applicable to attaching heels finally, and with the shoe supported upon a jack instead of upon a last.

And with the above and other objects in view, my invention resides in the novel features of form, construction, arrangement and combination of parts hereinafter described and pointed out in the claims.

In the accompanying drawings (three sheets),

Fig. 9 is an enlarged fragmentary side sectional view of a portion of Fig. 1, showing the self-equalizing clamping members of the machine in co-operation with a shoe-assembly having a so-called spike or Louis heel, the nail-setting mechanism being shown in final nail-driven position and the nail being set in the heel and the sole of the shoe;

Fig. 10 is a fragmentary front elevational detail view of the presser-foot of Fig. 4;

Fig. 11 is an enlarged fragmentary partly sectional view of the shiftable last-support of Fig. 2;

Fig. 12 is an enlarged fragmentary side elevational partly sectional view of the co-operating clamping mechanism of Fig. 1 in co-operation with a shoe-assembly including a low or so-called Cuban heel, other parts of the machine being removed;

Fig. 13 is a fragmentary enlarged front view of the nail-setting mechanism with the parts shown in final nail-driven position corresponding to Fig. 9, the upper portion of the shoe-assembly being broken away and other parts removed.

Figure 3:
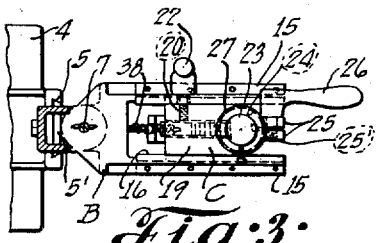
Fig. 3 is a sectional view taken approximately along the line 3—3, Fig. 1.

Referring now more in detail and by reference-characters to the drawings, which illustrate a preferred embodiment of the invention, the main supporting frame A of the machine includes a floor-plate 1 and upstanding standards 2 rigidly supporting, at a convenient elevation above the floor, a horizontal bed-plate 3. Fixed to and upstanding from the rear portion of the bed-plate 3 is a bracket 4 providing frontwise presented rearwardly inclined dove-tailed ways 5, for reciprocably supporting a clamp-head B, presently to be more particularly described, the head B, however, including suitably formed members for slidingly engaging the ways 5, as best seen in Fig. 3.

Figure 1:
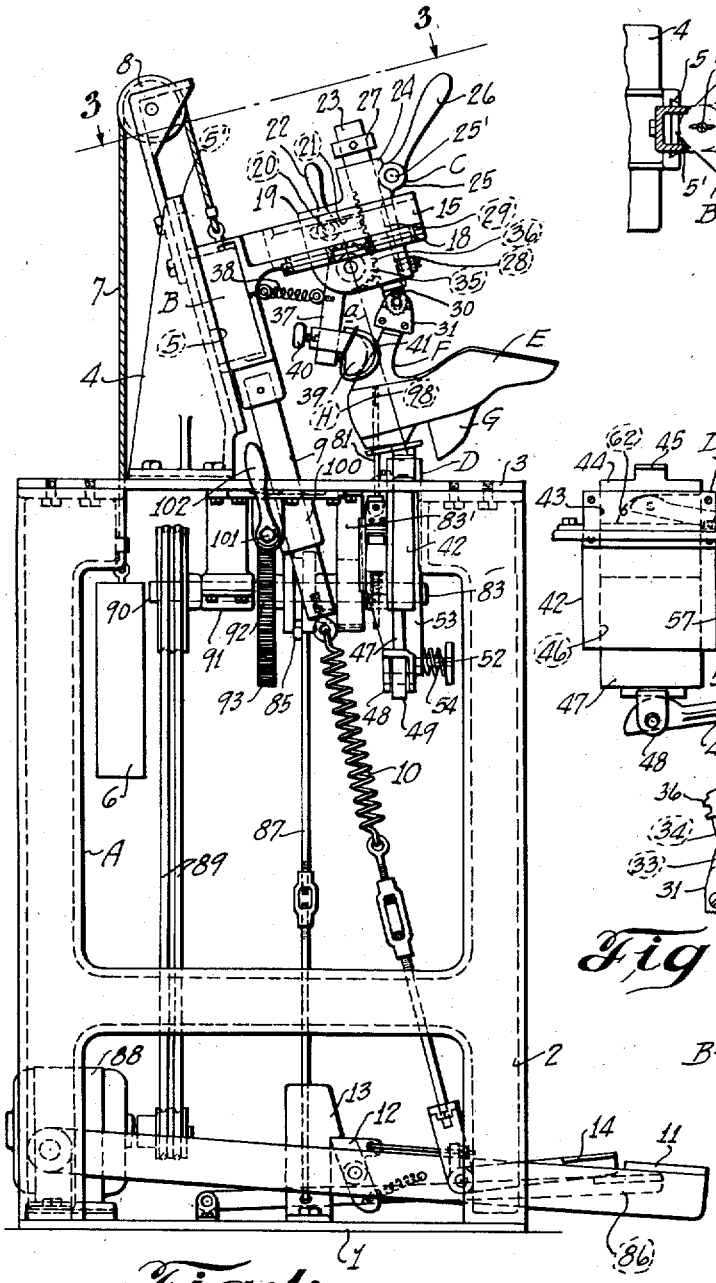
Fig. 1 is a side elevational view of a heel-attaching apparatus of my invention, showing a shoe-assembly mounted therein in fastening receptive-position, the particular shoe-assembly shown including a so-called spike or Louis heel.

Normally, the clamp-head B is yieldingly supported in elevated position on the bracket 4 by means of a suitable gravitationally acting member or weight 6 suitably co-operating with the clamp-head B by means of a cord 7 trained over a pulley 8 rotatably mounted at the top of the bracket 4, the ways 5 having suitable stops 5′ for limiting the upward movement of the head B, as best seen in Fig. 1.

Figure 8:
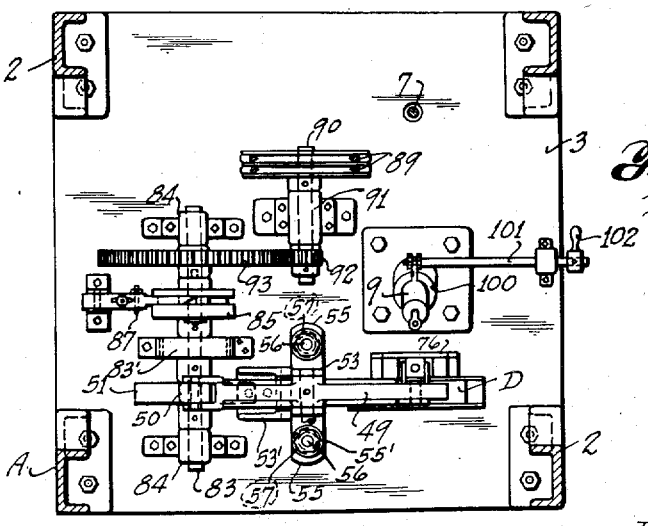
Fig. 8 is a bottom inverted plan view, partly in section, of the bed-plate and its carried apparatus.

For heel-mounting purposes, however, the head B is adjustably shifted on the bracket 4 for movement towards the bed-plate 3 by means of a pedal-operated shifting mechanism, which includes a plunger 9 firmly connected to the head B for depending therefrom slidingly in and through a split-housing 100 depending from the bed-plate 3, the housing 100 having co-operating ears engaged by the suitably threaded end of a clamp-shaft 101 extended suitably beyond the edge of the bed-plate 3 and provided with a handle 102, as best seen in Fig. 8.

The plunger is resiliently connected by means of a tensional member or spring 10, with a floor-adjacent foot-lever or pedal 11, preferably pivotally supported from the rear end of the floor-plate 1 for projecting forwardly through and from the frame A conveniently for foot-manipulation purposes by the operator of the machine.

The lever 11 may be releasably latched in depressed position by means of a spring-influenced pawl 12 latchingly engageable with a detent 13 upstanding from the floor-plate 1, the pawl 12 being operably connected for latch-releasing purposes with a toe-lever 14 pivotally supported on the lever 11.

Projecting forwardly from the head B right-angularly to the ways 5, is a pair of transversely spaced arms 15, the inner faces thereof being suitably longitudinally channeled providing upper and lower opposing ways 16, 17, respectively, the lower ways 17 being dovetailed in shape and provided with detachable bottom plates 18, 18.

Figure 5:
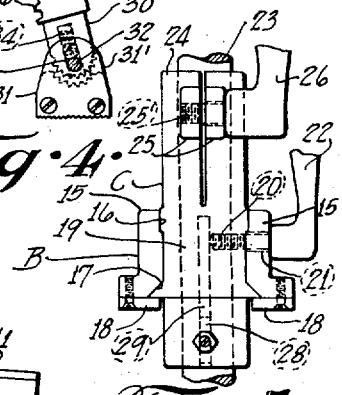
Fig. 5 is a fragmentary front view of the clamp-head carriage and its carried presser-foot-plunger, other parts being removed.
Figure 6:
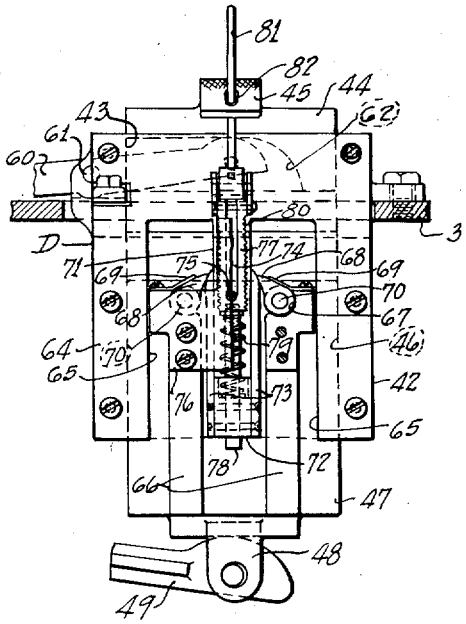
Fig. 6 is a rear view, partly broken away and in section, of the nail-setting mechanism of the machine, other parts thereof being removed.
Figure 7:
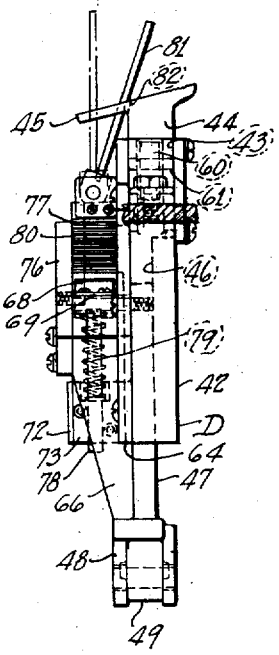
Fig. 7 is a side elevational view, partly in section, of Fig. 6.

Including a body portion 19 suitably formed for sliding co-operation with the ways 16, 17, is a carriage C having intermediately threaded therein a side-projecting clamping-stud 20 working in and through a longitudinal slot 21 provided in one of the arms 15, the stud 20 carrying a handle 22 adapted for carriage-locking purposes for hub-wise impinging of the arm 15, as best seen in Fig. 5.

Reciprocable in and through the forward end of the carriage C is a rack-plunger 23, the end of the body-member 19 having a split hub 24 upstanding therefrom for embracing the plunger 23 and carrying co-operating lugs 25 in which is suitably mounted and threaded a clamping stud 25′ provided with a handle 26, the latter for plunger-clamping purposes having hub-wise impingement with one of the lugs 25. On the upper projecting end of the plunger 23 is a set-collar 27 impingeable with the hub 24 for limiting the downward movement of the plunger, the latter being guided against rotation in the carriage by means of a key 28 suitably mounted in the carriage for sliding co-operation with a way 29 longitudinally provided in the plunger 23.

Figure 4:
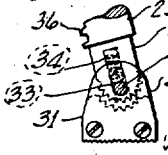
Fig. 4 is an enlarged fragmentary detail view of the self-adjusting presser-foot.

Shiftably supported for oscillation on and from a depending rounded nose-piece 30 projecting from the end of the plunger 23 is a swingable self-adjusting presser-foot 31 having a suitably scored bottom face for heel-engaging purposes and a toothed or serrated arcuate upper face concave to and for locking cooperation with a complementary toothed face provided on the rounded end of the nose-piece 30. The foot 31 is suitably provided with upstanding side members 31′ for embracing the nose-piece 30, and carrying a transverse pin-bolt 32 working in a longitudinal slot 33 provided in the nose-piece 30, a spring or like compressive member 34 being mounted in a hole above the pin 32 for normally spacing the foot 31 for freely oscillating on the nose-piece 30, as best seen in Fig. 4. The foot 31 may, if desired, be locked in predetermined position by means of nuts 32′ threaded on bolt 32.

Pivotally mounted in a suitably downwardly opening chamber provided in the rear portion of the carriage-body 19 is a half-pinion 35 having meshing co-operation with a series of rack-teeth 36 provided on the rear-face of the plunger 23. Preferably integrally depending from the pinion 35 is an arm 37 yieldingly urged for rearward oscillation in the vertical plane of reciprocation of the plunger 23 by means of a tensing member or spring 38 extended between the arm and the head B, as best seen in Fig. 1.

Adjustably shiftable on the arm 37 is a heel-saddle 39 provided with an arm-engaging-wing-nut 40 for locking the saddle 39 in adjusted position on the arm 37. The saddle 39 is provided with a forwardly presented face concave horizontally and convex vertically, and provided for heel-engaging purposes with a suitably resilient or felt-like lining 41, as best seen in Fig. 9.

Disposed in the vertical plane of reciprocation of the plunger 23 and approximately, as presently appearing, in vertical alinement therewith, is a nail-setting mechanism D, including a guide-block 42 extending through, and suitably secured to, the bed-plate 3. The top of the guide-block 42 is suitably enlarged providing an upwardly opening chamber 43 in which is slidingly mounted a vertically shiftable last-support 44 having an inclined rearwardly projecting or overhanging last-receptive shelf 45.

Opening upwardly into the chamber 43 and continuingly extending downwardly through the guide-block 42, is a vertical channel or way 46, in which is reciprocably mounted a normally depressed but vertically shiftable slide-block 47 having a depending yoke 48 loosely pivoted to, for actuation contact with an arcuate seat on, one end of a rockable lever 49, disposed transversely in the machine and having at its other end a roller 50 operably engaged with a retracted or neutral portion of heart-cam 51 normally inoperative but adapted when actuated for rocking the lever 49 for upwardly shifting the slide 47 in its way 46, for a purpose presently appearing.

The cam 51 comprises a neutral portion *b*, a nail-driving or rising portion *c*, a pressure-releasing or valley portion *d*, and a recompressing or rising portion *e* merging into the neutral portion *b*, for purposes presently appearing.

The lever 49 is mounted on a shaft 52 fulcrumed in an inverted resiliently supported yoke 53, depending from the bed-plate 3, the shaft 52 extending on one side of said yoke for supporting a torsional spring 54 mounted for urging the lever 49 in cam-following engagement of its roller 50 with the cam 51. Laterally projecting from the opposite sides of the yoke 53 is a pair of plate-engageable lugs 55 in which are shiftably engaged vertically disposed rods or bolts 56 extending also shiftably through the superimposed bed-plate 3. Preferably, the yoke 53 has suitable sliding bearings on its cam-adjacent side with a bracket 53′ depending from the bed-plate 3 for absorbing the lever-pulling reaction of the roller 50 on the cam 51.

Figure 2:
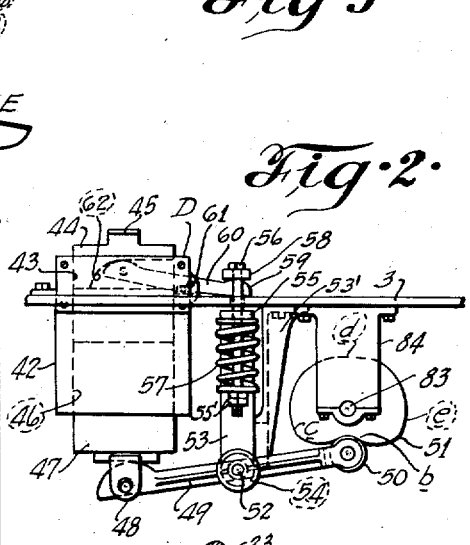
Fig. 2 is a fragmentary enlarged front view of the nail-setting operative mechanism of Fig. 1, other parts being removed.

The depending ends of the bolts 56 carry very strong compression members or springs 57 engaged between the lugs 55 and suitably adjustable bolt-carried members 55′, the springs 57 being normally in uncompressed or freely-extended position and the lugs 55 being more or less spaced from the plate 3, as best seen in Fig. 2.

The upper plate-projecting ends of the bolts 56 have engagement with a transverse-equalizer-bar 58 bearing on an upwardly presented arcuate seat provided on the end 59 of a presently described rockable lever 60, the lever end 59 furnishing a floating support for the bolts 56 liftable from but normally resting upon the plate 3 for suspending the bolts 56 therefrom for supporting the yoke 53 in its described relation with the plate 3. The lever 60 is pivotally, as at 61, supported in and through the adjacent wall of the chamber 43 for projecting its other end into a recess 62 provided in, for pivotal connection of the lever 60 with, the heel-support 44, as best seen in Fig. 11.

Detachably covering the rear of both the chamber 43 and the way 46 is a retainer-plate 64, having in its lower way-covering portion a pair of transversely spaced parallel vertical and downwardly opening slots 65, in which reciprocate respective brackets 66 rearwardly presented from and shiftable with the slide 47.

The horizontal upper faces of the brackets 66 are provided with respectively parallel grooves or pawl-seats 67 complementary to for rotatably supporting, the cylindrical hubs of opposingly swingable pawls or dogs 68, the latter being tensionally engaged by suitable flat springs or other tensing members 69, for normally urging the pawls 68 in co-operative presently-appearing clasping movement swingably one toward the other. The pawls 68 are retained in their seats by means of studs or other suitable members 70 threadedly projecting from the adjacent slide-block 47.

Disposed on the lower end of the medially depending portion or tongue 71 of the plate 64, for rearward presentation therefrom between the slide-brackets 66, is a lug 72 carrying a pair of spaced parallel upstanding pawl-trip-fingers or track-bars 73, disposed in the path of movement of the swingable ends of the pawls 68, the latter normally, that is, when the slide 47 is in depressed position, residing on the outside of and below the projecting end of the fingers 73.

Disposed normally in elevated position between the fingers 73 is a reciprocable rack-bar 77, provided with a longitudinal way 74 closed at its lower end, which way 74 is slidingly engaged by a key or pin 75 supported from a guide-plate 76 transversely in turn supported by and between the upper rear-presented ends of the brackets 66 for impingement by the key 75 of the lower wall of the way 74 for limiting the movement of the rack 77 relatively to the slide 47. From the rack-bar 77 depends a plunger 78 guidingly reciprocable also in and through the lug 72, the plunger 78 carrying a coil spring 79 or like tensional member, having its lower end resting in a suitable recess provided in the lug 72 and adapted with its upper end for normally impinging and resiliently supporting the rack-bar 77 for depressible actuation thereof more or less between the pawl-trip-fingers 73.

On its opposite pawl-presented faces the rack-bar 77 carries respective series of teeth 80 normally flanked by said fingers 73, but adapted to be claspingly engaged by the pawls 68 as the latter over-ride the suitably curved ends of the fingers 73 on upward shifting actuation of the slide-block 47.

The upper end of the rack-bar 77 is suitably bifurcated or yoked for pivotally supporting the lower end of an inclinably upstanding elongated nail-pin or plunger 81, suitably reciprocably and swingably mounted in and through an aperture or slot 82 provided in the superimposed last-supporting shelf 45 aforesaid.

Preferably the nail-plunger 81 is possessed of magnetic-qualities, for reasons soon to appear.

At this time I may briefly describe the cam 51 and its actuating mechanism best seen in Figs. 5, 8 and 13. The cam 51 is of conventional so-called "heart-shape", and is mounted on, for rotation with, a shaft 83, journaled in brackets 84 suitably depending from the bed-plate 3. The shaft 83 is adapted to be intermittently actuated, one revolution at a time, through a suitable conventional form of so-called "punch-press" clutch mechanism generally designated at 85, and actuable for such purposes at the will of the operator, by means of a suitably supported foot-pedal 86 having operative connection with the clutch 85 by means of a clutch-rod 87, as best seen in Fig. 1, the shaft 83 being normally restrained against rotation by a suitable friction-brake 83′ yieldable, however, to clutch-actuation of the shaft.

For actuation of such mechanism, I prefer to provide a motor 88 or other prime-mover means having operative connection as at 89 with a countershaft 90 journaled in a bearing 91 depending from the bed-plate 3 and carrying a pinion 92 meshing with a gear 93 rotatably mounted on the discontinuously rotating shaft 83 of the clutch 85 (Figs. 1 and 8).

One form of shoe-assembly, adapted to be employed in connection with my invention, is fragmentally shown in detail in Fig. 9, and I may here state that the method of attaching a heel to a shoe which my instant invention is designed to accomplish, is more fully set forth in my copending application for Letters Patent for Method of attaching heels to shoes, filed March 20, 1930, Serial No. 437,548, to which reference is hereby made.

The shoe-assembly includes a shoe upper E already made and ready for the attachment of the heel F thereto, the upper E being of any material, size, or shape, and including the usual insole 94 and outsole 95. The heel portions of the insole are usually reinforced by a fiber-piece 94′ and disposed between this and the outsole is a filler 96 usually of cork or like readily compressible material, the edges 96′ of the shoe-upper E being pulled into marginal overlapping engagement with the fiber-piece 94′, the outsole 95 partially in turn overlapping the upper-edges 96′.

The heel-portion of the outer sole 95 is cut away or trimmed for providing a heel-seat conforming as nearly as possible to the contour of the heel F, however, as this step is usually performed by hand, its shape varies and is seldom perfect.

The heel F, generally of wood or of some other suitable material or composition, is hollowed out upon its normally upper surface so as to form a cup 97 preferably concave in shape, adapted for co-operative disposition to fit the heel-seat of the outsole 95 for rim-wise engaging the adjacent pulled-over margins 96′ of the upper E; this fit should be as snug as possible for enhancing the appearance of the shoe, for increasing the strength of the attachment of the heel on the shoe, and in order that the adhesive therebetween, if used, shall most efficiently perform its intended function.

For the purposes of my invention, the shoe-last G is provided with a way or channel 98, extending through the top and at the rear of the last-cone 99, for reception of the nail-plunger 81, and being directed for nail-driving purposes suitably through the bottom of the last approximately at the medial portion of the heel-cup 97 of the shoe-mounted heel F as shortly appearing.

In describing the use and operation of my invention, it will be borne in mind that the machine is preferably employed at an intermediate stage of shoe-manufacture, the upper E having been formed on and containing the last G and the heel-seat also formed on the sole of the upper. I have found the operation now to be described may be accomplished with most facility and dispatch if the shoe-assembly be held by the operator in inverted position, hence, to avoid unnecessary manipulations of the shoe-assembly, and, further, to provide for easiest visual inspection of the position of the heel on the shoe during the nailing operation, I provide for mounting the shoe-assembly in the machine in such inverted position, that is, with the sole of the shoe in the vision of the operator.

The operator holds the previously prepared upper- and last-assembly, E—G, upright with one hand, while, with the other hand, he drops a nail, as H, point foremost into the last-channel 98, and then, inverting the assembly E—G over the plunger 81, deftly inserts the latter into the last channel 98 for magnetically holding the nail H upstandingly therein.

The operator then brings the front edge of the last-cone 99 into rocking engagement with and forwardly inclines the assembly E—G on, the last support 44. A suitable adhesive being applied to the cup 97 of the heel or to the heel-seat of the shoe, or both if desired, the operator places the heel F neatly and precisely on, with the heel-cup 97 opposing, the heel-seat of the shoe, and rocks the shoe-assembly E—F—G rearwardly on the last-support 44 until the plunger 81, swinging in shoe-guiding manner rearwardly in the slot 82, impinges the rear wall of the latter for disposing the plunger in aproximately vertical position, the plunger 81 penetrating the last-channel 98 until the plunger-impelled nail H point-wise resides against the inner-sole 94 of the shoe, as best seen in Fig. 1.

The extent to which the plunger 81 will penetrate the last depends upon the length of the nail H and the depth of the last-cone 99, which latter varies, of course, with different sizes and makes of shoes. For initially conforming its nail-setting position to such variations in the last, the plunger 81, after impinging its carried nail H with the insole of the shoe, is depressed from its normally elevated position, yieldingly upon the spring 79, the rack-bar 77 being correspondingly downwardly shifted between the fingers 73. At this time the operative, still holding the heel F in place on the shoe-assembly, steps on the pedal-lever 11 for causing the clamp-head B to descend obliquely, that is to say, both downwardly and at the same time forwardly, towards the shoe-assembly.

I may here briefly state that the carriage C is adjustably mounted on the arm 15 of the clamp-head B for initially setting or adjusting the machine for the several various styles and types of heels F, the carriage C being normally clamped in such predetermined or adjusted position on the clamp-head B, the plunger 23, however, being unclamped or loosened in the carriage C for purposes presently appearing.

Such descent of the clamp-head B brings the presser-foot 31 oscillatably into yielding engagement with the end or lift of the heel F, whereby the foot 31 is self-adjustingly tilted to the angle of the heel-end, the plunger 23 thereafter compressing the spring 34, for impinging the plunger-toothed-end lockingly with the co-operating toothed-face of the so-tilted foot 31.

As the clamp-head B continues its downward movement, the carriage C is shifted likewise on the heel-pressing plunger 23, the carriage-supported pinion 35 having rolling meshing co-operation with the plunger-rack 36 for forwardly swinging the pinion-carried arm 37 for actuating the previously suitably set or positioned saddle 39 in a curvilinear path intersecting the path of movement of the plunger 23, until the saddle-carried felt portion 41 impinges the rear face of the heel F.

On further movement of the clamp-head B the co-operably connected pressure-foot 31 and saddle 39 have pressure-equalizing engagement with the heel F on respective sides of a preferred line of clamping-pressure action, as indicated at *a* in Fig. 1, which passes through the forward half of the heel-seat of the shoe approximately right-angularly to the latter in preferably parallel relation with the direction of movement of the clamp-head B, for holding the heel in the position previously determined by the the operative in assembling the heel on the shoe.

As the clamp-head B thus engages the shoe-assembly the last-support 44 shifts downwardly in its chamber 43 for rocking the lever 60 until its bolt-carrying end 59 is spaced from the top face of the bed-plate 3 for impinging the bolt-suspended yoke-lugs 55 against the bottom face of the plate 3, the lever 60 being thus disposed for oscillation in either direction on its pivot 61, as best seen in Fig. 11.

Thereafter, the pedal-spring 10 yields to final movement of the pedal lever 11 to latched position, as best seen in Fig. 1. The operator, by suitably manipulating the shaft 101 clamps the plunger 9 in the housing 100 for locking the clamp-head B in shoe-assembly abutment position, and also manipulates the clamp-bolt 25 for locking the plunger 23 in the carriage C, whereby the presser-foot 31 and saddle 39 become rigidly fixed for restraining the heel against movement in the machine.

The operator then steps on the pedal 86 for actuating the clutch 85 for effecting a single revolution of the cam-shaft 83, the cam 51 correspondingly oscillating the lever 49 for reciprocation of the slide 47 in its ways 46.

At the initial lower position of movement of the slide 47, the pawls 68 each slidingly engage the respectively adjacent finger 73 in widely spaced apart position, but on upward shifting actuation of the slide 47 responsively to co-action of the roller 50 with the nail-driving portion *b* of the cam 51, the slide-carried pawls 68 override the end of the fingers 73 for swingable actuation of said pawls 68, under urging of the springs 69, into mutually approaching gripping co-operation with the toothed faces 80 of the rack-bar 77.

The pawls 68 being now in actuative engagement with the rack-bar 77, further upward movement of the slide 47 causes the rack-bar carried plunger 81 to drive the nail H successively through the shoe innersole 94, fiber-piece 94', filler 96, and outersole 95 into the heel F, with a nail-driving line of pressure action obliquely disposed to the clamping-pressure line of action of the abutment-opposed clamp-head B until the head of the nail H is in contact with the innersole 94.

At this time may be particularly pointed out that, temporarily, and while in the machine, the last G provides a foundation for the shoe-assembly which efficiently and effectively co-operates with the several parts of the machine for nail-setting purposes, particularly for supporting the upper in form-retaining position for stretching the heel-seat into the cup of the heel and firmly seating the heel thereon.

In such respect, the length of the nail H is so selected relatively to the stroke of the slide 47 and the throw of the cam 51, that, as the nail H is driven in the heel, the driving-resistance of the nail H, reacting through the lever 49, exerts on the lever-carrying yoke 53 a pull yieldingly resisted by the springs 57, the latter contracting their length responsively to downward swinging movement of the lever 49 about its slide-engaging end as a pivot for depressing the yoke 53 upon the springs 57, as best seen in Fig. 13.

Such spring-tensing pull or force is, through the bolts 56, the lever 60, applied with lifting effect on the last-support 44, for actuation thereof concordantly with the plunger 81, and with a line of pressure action disposed for equalizing the oblique nail-driving line of pressure action, for preventing shifting of the heel on the shoe during the nail-driving operation.

The last-support 44 becomes in turn resiliently supported for effecting a relatively sustained compressive distortion of the last, the heel, and the heel-seat material between the last-support 44 and the abutment clamp-head B by reason of which structural distortion of the shoe-assembly, the nail H, being undistorted, is caused to penetrate correspondingly into the compressed fibers of the heel in such manner that, on release of the compressive strain in, and ensuing expansion of, the heel-material, the nail resides therein in a highly tensed state, the rim of the heel-cup 97 being forced or grooved into the last-supported shoe-body E around the heel-seat thereof, and the head of the nail compressing the heel-seat material into the cup 97 of the heel until the nail-head is set flush-wise into the insole 94.

As the cam 51 revolves, the roller 50 drops into the valley-cam-portion *d* for momentarily more or less partially relaxing the pressure on the shoe-engaging members, and then as the roller rides upon the recompressing-portion *e* of the cam 51 the foregoing described shoe-assembly compressing operation is repeated.

On completion of a full revolution of the cam the same is disconnected from its actuating mechanism and the several parts are returned to normal position. The operator loosens the plungers 9 and 23, and steps on the pedal-release 14 for retracting the clamp-head B from the shoe-assembly E—F—G, whereupon the latter with its contained permanent fastening element H may be removed from the machine.

Fig. 1 illustrates the application of a so-called Louis heel to the shoe-assembly, while Fig. 12 illustrates the application of a so-called Cuban heel thereto, from which it will be seen that the saddle 39 is merely slightly shifted on the arm 37 from its position in Fig. 1, for efficient and effective co-operation of the equalizing members of the machine with such low or Cuban-heeled shoes, substantially in the manner and for the purposes hereinbefore set forth. Hence a further description thereof is omitted.

My invention is further particularly efficient in its intended purpose by reason of the fact that, in the so-permanently attached heel-and-shoe-assembly, the nail H being located in the center of the heel, and the last being in the shoe, the cooperation of the nail, the last, and the shoe, is highly effective for preventing rocking movement of the heel on the shoe after removal of the shoe-assembly from the machine.

It will be seen that my invention accomplishes its objects, and it will be understood that changes and modifications in the form, construction, arrangement and combination of parts may be made and substituted for those herein described and shown without departing from the nature and principle of my invention.

Having thus described my invention, what I claim as new and desire to secure by Letters Patent of the United States is:

1. In apparatus for attaching a heel to a shoe, the combination comprising means for setting a nail through the sole of the shoe into the heel, and means responsive to nail-setting operation for compressing the heel and the sole together.

2. In apparatus for attaching a heel to a lasted shoe-upper, the combination with a last-support of last-guided means for setting a nail through the sole of the upper into the heel, said means including a member yieldingly supported relatively to the last-support for initially disposing the nail pointwise against the insole of the upper.

3. In apparatus for attaching a heel to a lasted shoe-upper, in combination, a last-support, clamping means engaging the heel and the last, and last-guided means for setting a nail through the sole of the upper into the heel, said latter means including a nail-driving member shiftable relatively to the clamping means responsively to engagement of the nail with the insole of the upper.

4. In apparatus for setting a last-guided nail in the heel of a lasted shoe, in combination, a nail-driving member supported for longitudinally shiftable movement responsively to engagement of the nail with the insole of the upper, and means engageable with said member in shifted position for nail-driving actuation thereof.

5. In apparatus for setting a last-guided nail in the heel of a lasted shoe, in combination, a nail-driving member supported for shiftable movement responsively to engagement of the nail with the insole of the upper, and means including clamping members actuable for engaging said nail-driving member in shifted position for nail-driving-actuation thereof.

6. In apparatus for setting a nail in a shoe, in combination, nail-carrying means including a rack shiftable responsively to engagement of the nail with the work, and means including normally spaced pawls operable for actuative engagement with said rack in nail-shifted position for driving the nail in the work.

7. In apparatus for attaching a heel to a lasted shoe, in combination, nail-setting means including a lever and a member actuable thereby for setting a nail through the sole of the shoe into the heel thereof, and means including a shiftable last-support having resilient connection with the lever for compressing the heel, the last, and the sole of the shoe together.

8. In apparatus for attaching a heel to a shoe, in combination, nail-setting means including a member actuable for setting a nail through the sole of the shoe into the heel thereof, and means including a shoe-support shiftable responsively to nail-driving resistance of the nail-setting member for compressing the heel and the sole of the shoe together during the nail-setting operation.

9. In apparatus for attaching a heel to a shoe, clamping means including a head having a freely tiltable member supported thereon for shiftable movement of said member responsively to engagement thereof with the work, and means on the head engageable by said member when in work shifted position for retaining the same in tilted co-operation with the work.

10. In apparatus for attaching a heel to a lasted shoe, clamping means including a support and a member carried thereby for engaging the cone of the last, a clamp-head shiftable on the support relatively to said last-engaging member rightangularly to the heel-seat of the shoe, and means for locking the head in shifted position on the support.

11. In apparatus for attaching a heel to a lasted shoe, in combination, clamping means operable along a line of clamping pressure intersecting the forward half of the heel-seat for retaining the heel on the shoe, nail-setting means operable along a line of nail-driving pressure obliquely disposed to the clamping pressure line for driving a nail through the sole of the shoe into the heel thereof, and last-lifting means operable along a line of pressure-action disposed for equalizing said nail-driving line of pressure for preventing shifting of the heel during the nail driving operation.

12. In apparatus for attaching a heel to a lasted shoe, in combination, nail-setting means including a member shiftable for driving a nail through the sole of the shoe into the heel thereof, clamping means including a last-supporting member shiftable for compressing the last, the heel and the sole of the shoe together during the nail-setting operation, and means including a power-operable member co-operably connecting the nail-setting member and the last-supporting member for effecting concordant actuation thereof.

13. In apparatus for attaching a heel to a lasted shoe, in combination, a last-support including a last-lifting member, and nail-driving means cooperable with the last-lifting member for setting a nail through the sole of the shoe into the heel thereof.

14. Apparatus for attaching a heel to a shoe comprising, in combination, means for setting a nail through the sole of the shoe into the heel, and mechanism operable by and with the nail-setting means for compressing the heel and the shoe together.

15. Apparatus for attaching a heel to a lasted shoe comprising, in combination, means including a member actuable for setting a nail through the sole of the shoe into the heel, and mechanism operable responsively to actuation of said member for compressing the heel and the lasted shoe together.

16. Apparatus for attaching a heel to a lasted shoe comprising, in combination, means for setting a nail through the sole of the shoe into the heel, and mechanism including a member shiftably responsive to actuation of the nail-setting means for compressing the heel and the lasted shoe together.

17. Apparatus for attaching a heel to a shoe comprising, in combination, means for setting a nail through the sole of the shoe into the heel, clamping means, and mechanism including a shiftable member co-operating with the clamping means and actuable responsively to operation of the nail-setting means for compressing the heel and the shoe together.

18. Apparatus for attaching a heel to a lasted shoe comprising, in combination, means for setting a nail through the sole of the shoe into the heel, clamping means including a resiliently supported member, and mechanism having connection with said member for yieldingly engaging the same responsively to operation of the nail-setting means for compressing the heel and the lasted shoe together.

19. Apparatus for attaching a heel to a shoe comprising in combination, a nail-setting plunger, clamping means, and lifting means resiliently connecting the clamping means with the plunger for setting a nail through the sole of the shoe into the heel.

20. In an apparatus for attaching a heel to a shoe, in combination, nail-driving means, clamping means, and means including a yieldable support co-operable both with the clamping means and the nail-driving means for compressing the heel and the shoe-sole together responsively to actuation of the nail-driving means.

21. In an apparatus for attaching a heel to a shoe, in combination, clamping means including a plunger for engaging the lift of the heel, a swingable arm for engaging the back-face of the heel, and means co-operably connecting the plunger with the arm for swinging movement of the latter responsively to engagement of the plunger with the lift of the heel.

22. In a machine for operating upon the heel-portions of shoes, a work-support, movable fastening-inserting mechanism and movable work-pressing mechanism co-operating with the support, operating means for moving one of the mechanisms, and means for moving the other mechanism by a force dependent upon the resistance encountered by the mechanism first moved.

23. In a machine for operating upon the heel-portions of shoes, a work-support, movable fastening-inserting mechanism and movable work-pressing mechanism co-operating with the support, operating means for moving one of the mechanisms, and means for transmitting the reactive force of the operated mechanism to the associated mechanism to effect its movement.

24. In a heel-attaching machine, a support, a driver movable through the support, a heel-abutment co-operating with the support, and means made effective by the movement of the driver for forcing the support and abutment into heel-clamping relation.

WALTER A. THUM.